United States Patent
Kim et al.

(10) Patent No.: US 9,522,593 B2
(45) Date of Patent: *Dec. 20, 2016

(54) MISFUELLING PREVENTION SYSTEM FOR VEHICLE

(71) Applicant: Hyundai Motor Company, Seoul (KR)

(72) Inventors: Myeong Hwan Kim, Hwaseong-si (KR); Bu Yeol Ryu, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 235 days.

This patent is subject to a terminal disclaimer.

(21) Appl. No.: 14/449,582

(22) Filed: Aug. 1, 2014

(65) Prior Publication Data

US 2015/0158380 A1 Jun. 11, 2015

(30) Foreign Application Priority Data

Dec. 10, 2013 (KR) .......................... 10-2013-0152852

(51) Int. Cl.
*B60K 15/04* (2006.01)

(52) U.S. Cl.
CPC ........... *B60K 15/0406* (2013.01); *B60K 15/04* (2013.01); *B60K 2015/0429* (2013.01); *B60K 2015/0435* (2013.01); *B60K 2015/0461* (2013.01); *B60K 2015/0483* (2013.01)

(58) Field of Classification Search
CPC ................ B60K 15/04; B60K 15/0406; B60K 2015/0429; B60K 2015/0435; B60K 2015/0461; B60K 2015/0483
USPC .......................... 141/348–350; 220/86.2–86.3
See application file for complete search history.

(56) References Cited

U.S. PATENT DOCUMENTS

| 6,155,316 A * | 12/2000 | Benjey ................... B60K 15/04 141/302 |
| 7,182,111 B2 * | 2/2007 | McClung ............... B60K 15/04 141/301 |
| 7,293,586 B2 * | 11/2007 | Groom ................... B60K 15/04 141/301 |
| 7,661,550 B2 | 2/2010 | Feichtinger |

(Continued)

FOREIGN PATENT DOCUMENTS

| EP | 2 322 373 A1 | 5/2011 |
| KR | 20-0379665 Y1 | 3/2005 |

(Continued)

*Primary Examiner* — Nicolas A Arnett
(74) *Attorney, Agent, or Firm* — Morgan, Lewis & Bockius LLP (57) ABSTRACT

A misfuelling prevention system for a vehicle may include an upper housing and an inner housing supported in the fuel filler neck, positioned in a bottom portion of the upper housing, and slidable in a single direction by a center returning spring interposed between the upper housing side and the inner housing, a stopper being rotatably installed at a side of the inner housing and elastically biased by a stopper spring, wherein the stopper is rotatable when a fuelling gun contacts with an end of the stopper, and a flapper having a first end rotatably installed at another side of the inner housing and a second end selectively caught in a groove portion of the stopper, wherein the flapper is opened by being pushed by the fuelling gun when the flapper is released from being caught by the stopper while the fuelling gun contacts with the end of the stopper.

8 Claims, 5 Drawing Sheets

(56) References Cited

U.S. PATENT DOCUMENTS

| | | | |
|---|---|---|---|
| 7,665,493 B2 * | 2/2010 | Groom | B60K 15/04 141/350 |
| 7,967,041 B2 * | 6/2011 | Groom | B60K 15/04 141/350 |
| 7,967,042 B2 | 6/2011 | Groom et al. | |
| 8,281,825 B2 * | 10/2012 | Yoshida | B60K 15/0406 141/350 |
| 8,910,678 B2 * | 12/2014 | Cisternino | B60K 15/04 141/350 |
| 9,150,100 B2 * | 10/2015 | Kim | B60K 15/0409 |
| 9,272,617 B2 * | 3/2016 | Ryu | B60K 15/04 |
| 2002/0020465 A1 * | 2/2002 | Gzik | B60K 15/04 141/390 |
| 2006/0032549 A1 * | 2/2006 | McClung | B60K 15/04 141/97 |
| 2006/0289084 A1 * | 12/2006 | Groom | B60K 15/04 141/367 |
| 2007/0034287 A1 * | 2/2007 | Groom | B60K 15/04 141/350 |
| 2009/0020182 A1 * | 1/2009 | Groom | B60K 15/04 141/349 |
| 2010/0175785 A1 * | 7/2010 | Groom | B60K 15/04 141/350 |
| 2012/0211489 A1 | 8/2012 | Walser et al. | |
| 2014/0284329 A1 * | 9/2014 | Frank | B60K 15/03006 220/86.2 |
| 2014/0332529 A1 * | 11/2014 | Ryu | B60K 15/04 220/86.2 |
| 2014/0353312 A1 * | 12/2014 | Kim | B60K 15/0409 220/86.2 |
| 2015/0069058 A1 * | 3/2015 | Ryu | B60K 15/04 220/86.2 |
| 2015/0102031 A1 * | 4/2015 | Yoshida | B60K 15/04 220/86.2 |
| 2015/0298542 A1 * | 10/2015 | Kim | B60K 15/04 220/86.2 |

FOREIGN PATENT DOCUMENTS

| | | |
|---|---|---|
| KR | 10-0535510 B1 | 12/2005 |
| KR | 10-2009-0114949 A | 11/2009 |
| WO | WO 2011/086344 A1 | 7/2011 |

* cited by examiner

[ CROSS-SECTIONAL VIEW A-A ]

[ CROSS-SECTIONAL VIEW B-B ]

MISFUELLING PREVENTION SYSTEM FOR VEHICLE

CROSS-REFERENCE TO RELATED APPLICATION

The present application claims priority to Korean Patent Application No. 10-2013-0152852 filed Dec. 10, 2013, the entire contents of which is incorporated herein for all purposes by this reference.

BACKGROUND

Field of the Invention

The present invention relates to a misfuelling prevention system for a vehicle, and more particularly, to an incorrect fuelling prevention device for a vehicle which may prevent a different type of fuel from being incorrectly dispensed to a diesel vehicle.

Description of Related Art

In general, a fuel tank, which stores fuel required for combustion in an engine, is provided in a vehicle, and a fuel filler neck through which fuel may be dispensed is provided at an end of a fuelling pipe that is connected with the fuel tank.

A diameter of a fuelling gun for dispensing fuel to the fuel filler neck is varied depending on gasoline or diesel fuel, and a fuel dispensing speed is also varied.

A diameter of a fuel fuelling gun for dispensing diesel fuel is commonly larger than a diameter of a fuel fuelling gun for dispensing gasoline fuel.

Accordingly, a diameter of a fuel filler neck for a diesel vehicle is also formed to be larger than a diameter of a fuel filler neck for a gasoline vehicle.

For example, a diameter of the diesel fuelling gun is about 25 to 31 mm, and a diameter of the gasoline gun is about 19 to 21 mm.

Further, a diameter of the fuel filler neck for a gasoline vehicle is approximately 22 mm, and a diameter of the fuel filler neck for a diesel vehicle is approximately 26 to 32 mm.

Therefore, while incorrect fuelling does not occur in the gasoline vehicle because the diesel gun cannot be inserted, that is, only the gasoline gun can be inserted, but a problem with incorrect fuelling frequently occurs in the diesel vehicle because the gasoline gun as well as the diesel gun can be inserted.

The diesel fuel is mainly used in large-sized vehicles in the related art, but the recent trend is that the number of passenger vehicles using diesel fuel is universally increased, and self-service fuelling is increased due to high fuel prices, and as a result, cases in which gasoline is incorrectly dispensed into the diesel vehicle at a gas station has increased.

Recently, as fuelling prices are increased, the number of self-service gas stations where drivers autonomously dispense fuel is gradually increased.

The self-service gas station provides a plurality of self-service fuel dispensing devices so that the driver may directly dispense fuel to the driver's vehicle, thereby increasing convenience for the driver.

However, because the gasoline gun for dispensing gasoline fuel and the diesel gun for dispensing diesel fuel are provided together on a single fuel dispensing device, and each of the two fuel dispensing switches for selecting a fuel type is provided at the corresponding fuelling gun side, there are many problems in that in a case in which a driver carelessly and abnormally selects the fuelling gun or the fuel dispensing switch, fuel is inevitably mixed, and incorrect fuelling occurs.

When fuel is dispensed into the diesel vehicle, a fuelling accident in which gasoline is incorrectly dispensed actually occurs frequently, the incorrect fuelling results in deterioration in output of the engine and damage to the engine, an operation of the engine may be stopped during driving which may leads to a big accident, and the incorrect fuelling may cause damage to devices in a fuel system such as an injection pump.

In consideration of the aforementioned problems, US Patent Application Publication No. 2012/0211489 A1, U.S. Pat. No. 7,661,550 B2 and U.S. Pat. No. 7,967,042 B2 and the like suggest a technology that enables fuelling while operating a stopper only in the case in which the diesel gun having a large diameter is inserted.

However, the aforementioned related arts did not consider the insertion of a diesel gun for a commercial vehicle which has a diameter of 31 mm, and were disadvantageous in terms of a structure and an operation, and insufficient for actively coping with the incorrect fuelling prevention because there is a risk that a fuel dispensing inlet is opened even in a case in which a gasoline gun having a small diameter is inserted.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a misfuelling prevention system for a vehicle which may basically prevent incorrect fuel from being dispensed into a vehicle, by implementing a new type of incorrect fuelling prevention structure in which a diameter difference between a gasoline gun and a diesel gun is used when fuel is dispensed, a flapper is opened by operating a stopper only in a case in which the diesel gun having a large diameter is inserted, and when the stopper is arbitrarily operated by using the gasoline gun having a small diameter, the entire inner housing is pushed to one side, and the stopper is not operated, such that the flapper is not opened.

In an aspect of the present invention, a misfuelling prevention system for a vehicle, may include an upper housing which is installed at an inlet side of a fuel filler neck, an inner housing which is supported in the fuel filler neck, positioned in a bottom portion of the upper housing, and slidable in a single direction by a center returning spring that is interposed between the upper housing side and the inner housing, a stopper and a stopper spring, the stopper being rotatably installed at a side of the inner housing and elastically biased by the stopper spring, wherein the stopper is rotatable when a fuelling gun contacts with an end of the stopper, and a flapper elastically biased by a flapper spring, the flapper having a first end that is rotatably installed at another side of the inner housing and a second end that is selectively caught in a groove portion of the stopper, wherein the flapper is opened by being pushed by the fuelling gun when the flapper is released from being caught by the stopper while the fuelling gun contacts with the end of the stopper.

The upper housing and the inner housing may have a guide groove in a horizontal direction and a guide projection in the horizontal direction respectively, and are slidingly coupled to each other by the guide groove and the guide projection so that the inner housing is slidingly guided in the upper housing.

An elastic coefficient of the center returning spring which is interposed between the upper housing and the inner housing is smaller than an elastic coefficient of the stopper spring.

A rotation prevention guide is positioned at a rear side of the stopper and protrudes from the upper housing downwards so as to restrict rotation of the stopper.

An inner diameter of the inner housing is set to a maximum of 32 mm, and an interval between a contact protruding portion of the stopper which is positioned to protrude toward an inner side of the inner housing and a housing wall surface is set to 22 to 23 mm.

The misfuelling prevention system for a vehicle provided by the present invention has the following advantages.

Firstly, a mechanism in which the stopper is selectively operated depending on a diameter of the fuelling gun so as to open the flapper is adopted, thereby basically preventing incorrect fuel from being dispensed to a vehicle.

Secondly, a structure in which when a fuelling gun for dispensing a different type of fuel is inserted, the housing itself slides such that the stopper is not operated is adopted, and as a result, a misfuelling prevention structure may be implemented using simple structure and operational manner, thereby actively coping with incorrect fuelling due to a mistake and operational inexperience of a worker who dispenses fuel.

Thirdly, even when the gasoline gun is eccentrically inserted or inclinedly inserted, fuel may not be dispensed, and because of a simple structure, mass production is available.

Fourthly, the misfuelling prevention system for a vehicle may be widely applied to the diesel gun (Ø31) for a commercial vehicle as well as the diesel gun (Ø24) for a passenger vehicle.

Fifthly, as convenience for a customer is increased, marketability may be improved and low costs may be implemented.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail with reference to the accompanying drawings.

Figure 1:
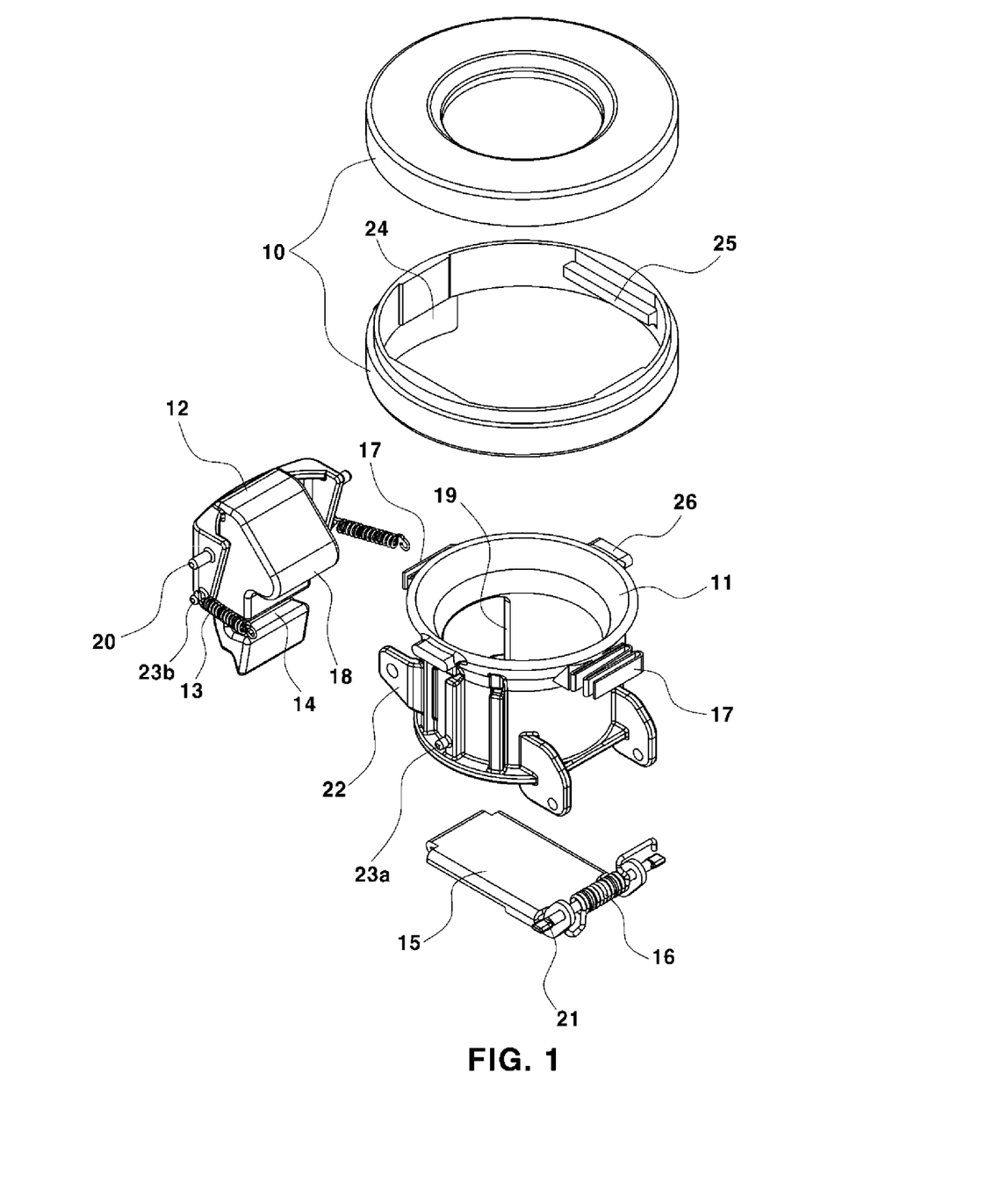
FIG. 1 is an exploded perspective view illustrating a misfuelling prevention system according to an exemplary embodiment of the present invention.
Figure 2:
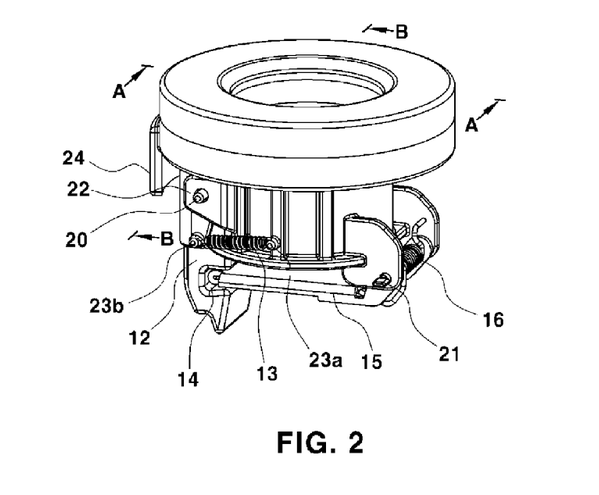
FIG. 2 is a coupled perspective view illustrating the misfuelling prevention system according to the exemplary embodiment of the present invention.
Figure 3:
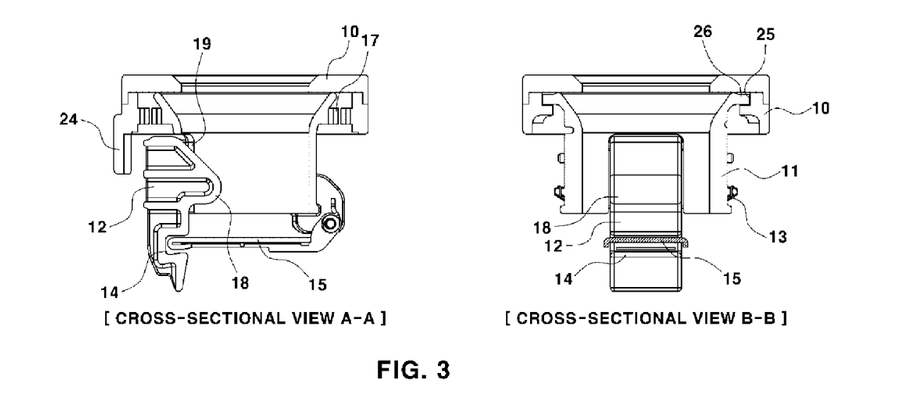
FIG. 3 shows cross-sectional views illustrating the misfuelling prevention system according to the exemplary embodiment of the present invention.

FIGS. 1 to 3 show an exploded perspective view, a coupled perspective view, and cross-sectional views, which illustrate a misfuelling prevention system according to an exemplary embodiment of the present invention.

As illustrated in FIGS. 1 to 3, the misfuelling prevention system may open and close a fuel filler neck using a flapper which is opened by a stopper that is selectively operated depending on a diameter of a fuelling gun that is inserted into the fuel filler neck, and the misfuelling prevention system has a structure in which fuel may not be dispensed when a fuelling gun is inserted for dispensing incorrect fuel, for example, when a gasoline gun is inserted into a fuel filler neck of a diesel vehicle.

To this end, there are provided a circular upper housing 10 which is installed at an inlet side of a fuel filler neck for dispensing fuel, and a cylindrical inner housing 11 which is disposed in the fuel filler neck so as not to be moved upward and downward, and installed to be slidable in one direction.

Here, a structure for supporting the inner housing inside the fuel filler neck so that the inner housing is not moved upward and downward is not particularly limited, and may be adopted as long as the structure is commonly known in the corresponding Field of the Invention.

Further, the upper housing 10 may be formed in a shape in which two cylindrical housings are coupled in an up and down direction.

As a means for restricting rotation of a stopper 12, which will be described below, by coming into contact with the stopper 12 at a position where the stopper 12 is pushed to one side at predetermined distance, a rotation prevention guide 24 is provided in the upper housing 10.

Here, the rotation prevention guide 24 may be substituted with an inner wall surface of the fuel filler neck in some cases.

In this case, the rotation prevention guide 24 is formed to have a structure that vertically extends downward from one side of a lower end portion of an edge of the upper housing 10, and the rotation prevention guide 24, which is formed as described above, is positioned at a rear side of the stopper 12 so as to support a rear surface of an upper end portion of the stopper 12 that is pushed by the fuelling gun to one side (a side where the rotation prevention guide is positioned), such that the stopper 12 may be caught by the rotation prevention guide 24, and rotation of the stopper 12 may be prevented.

Further, the inner housing 11 is disposed in an approximately concentric circle at a bottom portion of the upper housing 10, and as a result, the fuelling gun may be inserted along an inner side of the upper housing 10 and an inner side of the inner housing 11 when the fuel is dispensed.

Particularly, the inner housing 11 is installed to be slidable in one direction (for example, a left and right direction) such that the entire inner housing may be moved in one direction on a horizontal line in the case in which the fuelling gun, such as the gasoline gun, having a small diameter pushes the inner housing 11, or is eccentrically or inclinedly inserted into the inner housing 11.

To this end, center returning springs 17, which come into contact with a wall surface of the inner housing 11, are disposed at both inner sides of the upper housing 10, and the center returning spring 17, which is disposed above, is installed so that both ends of the center returning spring 17 are supported between an inner wall surface of the upper housing 10 and an outer wall surface of the inner housing 11.

Two center returning springs 17 may be provided at positions opposite to each other, and as a result, the inner housing 11 keeps a balance by receiving restoring force exerted by both the center returning springs 17 and is not biased to any one side, thereby maintaining a center position of the inner housing 11 (a position where the inner housing forms a concentric circle with the upper housing).

That is, when the inner housing 11 returns back to an initial position by elastic force which is exerted by both the center returning springs 17, the inner housing 11 may return while being accurately aligned at the home position.

In addition, guide grooves 25 are formed in the inner wall surface of the upper housing 10 at positions opposite to each other, for example, at positions having a phase difference of 90° with respect to the positions where the center returning springs 17 are positioned so as to face each other, and correspondingly, guide projections 26, which are correspondingly inserted into the guide grooves 25 in a one-to-one manner, are formed on an outer edge of an upper end portion of the inner housing 11.

Accordingly, when the inner housing 11 is moved in the left and right direction, the inner housing 11 may be guided by a slide coupling structure between the guide grooves 25 and the guide projections 26.

Particularly, the center returning spring 17, which is interposed between the upper housing 10 and the inner housing 11 so as to resiliently support the inner housing 11, has an elastic coefficient smaller than that of a stopper spring 13 which resiliently supports the stopper 12.

Accordingly, when the stopper 12 is pushed by the fuelling gun, the inner housing 11, which is supported by the center returning spring 17 having a small elastic force, may be first moved before the stopper 12, which is supported by the stopper spring 13 having a large elastic force, is rotated.

Further, the stopper 12 is provided as a means for restricting an operation of the flapper 15 for opening and closing the fuel filler neck.

The stopper 12 is formed in a shape which includes a contact protruding portion 18 that is disposed at an upper side and comes into contact with the fuelling gun, and a groove portion 14 that is disposed at a lower side and catches the flapper 15, and the stopper 12 is installed to be rotatable about stopper pins 20 each of which is positioned at one side of the inner housing 11 such that the stopper pins 20 are positioned on both side surfaces of the stopper 12.

That is, the stopper pins 20, which are positioned on both the side surfaces of the stopper 12, are fitted into and coupled to both pin brackets 22 that are positioned on an outer surface of one side of the inner housing 11, and in a state in which the stopper pins 20 are coupled to the pin brackets 22 as described above, the stopper 12 may be rotated about the stopper pins 20 in the up and down direction.

Further, the contact protruding portion 18 of the stopper 12 may be positioned inside the inner housing through a cut-out portion 19 formed in the inner housing 11, and the rounded contact protruding portion 18, which is positioned inside the inner housing 11 as described above, may come into contact with the fuelling gun which enters the inner side of the inner housing.

In addition, the stopper springs 13 are installed to be connected between spring pins 23b, which are positioned on both side surfaces of the stopper 12, and spring pins 23a which are positioned on both outer surfaces of the inner housing 11.

Accordingly, when the fuelling gun is taken out, the stopper 12, which has been pushed by the fuelling gun, may return to an approximately vertical posture by elastic force of the stopper springs 13 so as to catch the flapper 15.

In addition, the flapper 15 is provided as a means for substantially opening and closing the fuel filler neck.

The flapper 15 is disposed in a horizontal posture so as to be in close contact with a bottom portion of the inner housing 11, and in a state in which the flapper 15 is disposed as described above, the flapper 15 is installed to be rotatable in the up and down direction by one side pin structure.

For example, one side end portion of the flapper 15 is supported using a flapper pin 21 while the flapper pin 21 penetrates both the pin brackets 22 which are positioned at another side of the inner housing 11 (for example, at positions opposite to the positions where the stopper is positioned), and another side of the inner housing 11 is positioned in the groove portion 14 formed in the stopper 12 so as to be caught in the up and down direction.

Accordingly, in a state in which the flapper 15 is released from being caught by the stopper, the flapper 15 may be rotated about the flapper pin 21 in the up and down direction.

Further, a flapper spring 16 is provided as a means for returning the flapper 15, and the flapper spring 16 is installed in a structure in which one side of the flapper spring 16 is fixed to the inner housing side, and another side of the flapper spring 16 is fixed to the flapper side in a state the flapper spring 16 is wound several times around the flapper pin 21 that serves as a rotation center pin of the flapper 15.

Accordingly, the flapper 15, which has been pushed downward by the fuelling gun, may return back to the original horizontal posture by elastic force exerted by the flapper spring 16 so as to be positioned in the groove portion 14 of the stopper 12.

Meanwhile, an incorrect fuelling prevention device provided in an exemplary embodiment of the present invention may be configured to have a structure that may be applied to both the diesel fuelling gun for a passenger vehicle and the diesel fuelling gun having a large diameter for a commercial vehicle, thereby improving convenience for a customer.

To this end, an inner diameter of the inner housing 11 is set to a maximum of 32 mm such that both the diesel gun (Ø24) for a passenger vehicle and the diesel gun (Ø31) for a commercial vehicle may be inserted into the inner housing 11.

In addition, an interval between the contact protruding portion 18 of the stopper 12 which protrudes toward the inner side of the inner housing 11 and the wall surface positioned at the opposite side to the inner housing 11 is set to 22 to 23 mm, such that interference between the gasoline gun (Ø21) and the stopper 12 may be avoided, and the diesel gun (Ø24) for a passenger vehicle or the diesel gun (Ø31) for a commercial vehicle may come into contact with the stopper 12 when the diesel gun (Ø24) for a passenger vehicle or the diesel gun (Ø31) for a commercial vehicle is inserted.

Therefore, a use state of the misfuelling prevention system, which is configured as described above, will be described below.

Figure 4:
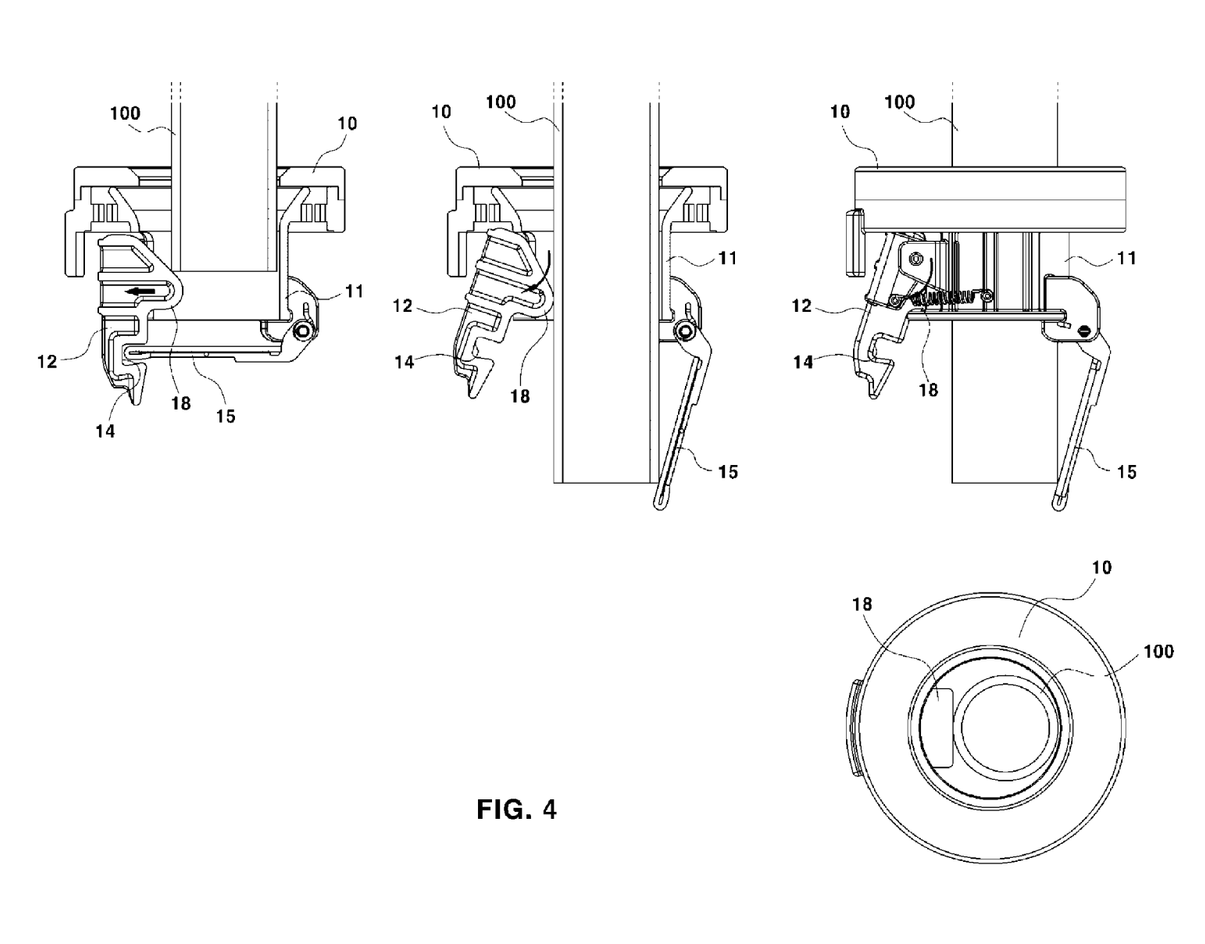
FIG. 4 shows cross-sectional views illustrating an operational state when a diesel gun is inserted in the misfuelling prevention system according to the exemplary embodiment of the present invention.

FIG. 4 shows cross-sectional views illustrating an operational state when the diesel gun is inserted in the misfuelling prevention system according to the exemplary embodiment of the present invention.

As illustrated in FIG. 4, a state in which fuel is dispensed to the fuel filler neck for a diesel vehicle using the diesel gun is illustrated.

When a diesel gun 100, which is larger than an interval of 22 mm between the stopper 12 and the inner housing 11, is inserted, the stopper 12 is rotated and pushed outward when contact between the diesel gun 100 and the contact protruding portion 18 occurs.

At the same time, the flapper 15 is released from being caught by the groove portion 14 of the stopper 12 such that the flapper 15 is rotated and pushed downward by force by which the diesel gun 100 pushes the flapper 15, and as a result, diesel fuel may be dispensed using the diesel gun 100.

Figure 5:
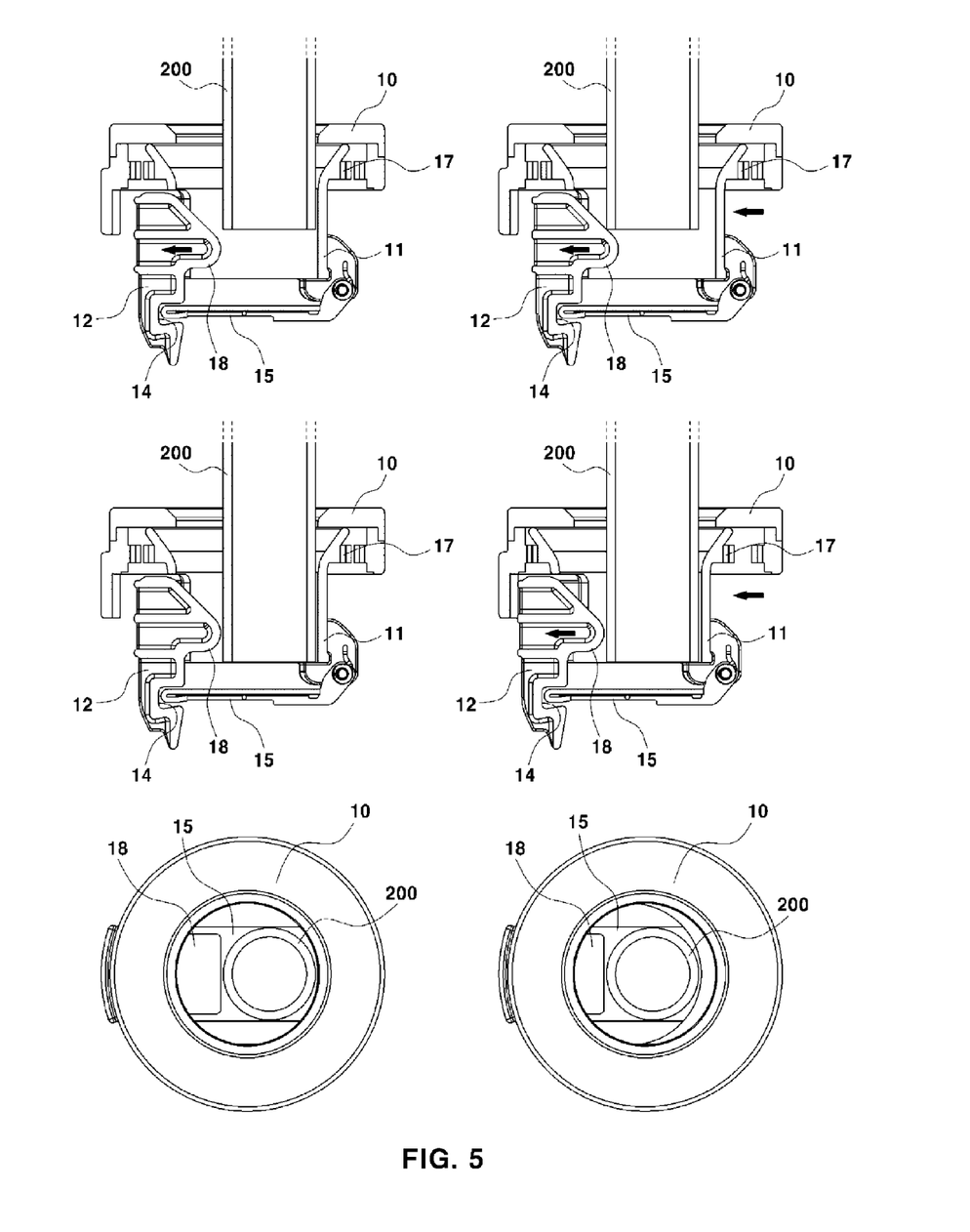
FIG. 5 shows cross-sectional views illustrating an operational state when a gasoline gun is inserted in the misfuelling prevention system according to the exemplary embodiment of the present invention.

FIG. 5 shows cross-sectional views illustrating an operational state when the gasoline gun is inserted in the misfuelling prevention system according to the exemplary embodiment of the present invention.

As illustrated in FIG. 5, a state in which fuel is dispensed to the fuel filler neck for a diesel vehicle using the gasoline gun is illustrated.

When a gasoline gun 200, which is smaller than the interval of 22 mm between the stopper 12 and the inner housing 11, is inserted, the gasoline gun 200 does not come into contact with the contact protruding portion 18 of the stopper 12, such that the stopper 12 is not rotated, and a catching state between the stopper 12 and the flapper 15 is maintained, and as a result, fuel is not dispensed using the gasoline gun 200.

Figure 6:
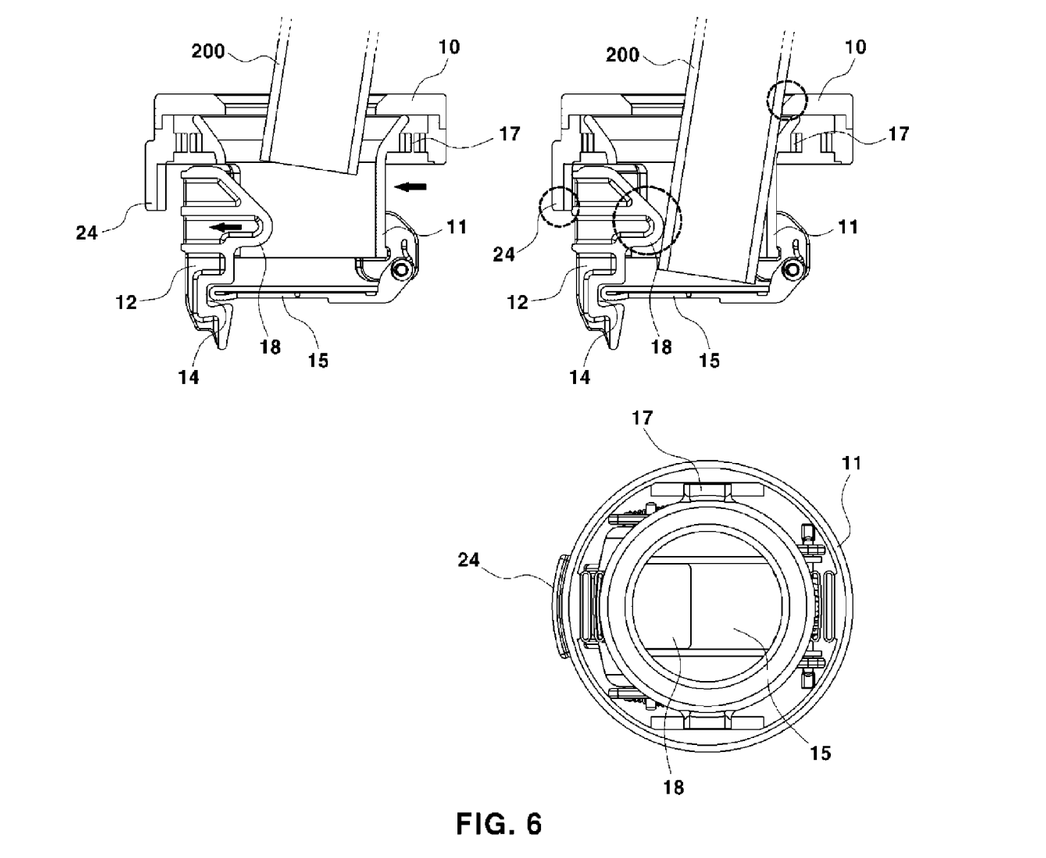
FIG. 6 shows cross-sectional views illustrating an operational state when the gasoline gun is inclinedly inserted in the misfuelling prevention system according to the exemplary embodiment of the present invention.

Meanwhile, as illustrated in FIG. 6, in a case in which the gasoline gun 200 is inclinedly inserted or eccentrically inserted due to carelessness or the like of a worker who dispenses fuel, and the contact protruding portion 18 of the stopper 12 is pushed by the gasoline gun 200, the entire inner housing 11 slides in a direction in which the gasoline gun 200 pushes the contact protruding portion 18, such that the stopper 12 may not be pushed, and as a result, fuel is not dispensed even in this case.

Further, even in a case in which the gasoline gun 200 continuously applies force to push the stopper side, the stopper 12 is restricted by the rotation prevention guide 24 positioned in the upper housing 10, and in this case, the stopper 12 is also not pushed such that fuel is not dispensed.

As such, in an exemplary embodiment of the present invention, a combination of the stopper and the flapper, which are selectively operated depending on a diameter of the fuelling gun, and a combination of the inner housing, which is slidable by the fuelling gun, and the housing spring, are implemented in the fuel filler neck of the vehicle side, such that fuel may be dispensed when the fuelling gun is inserted for dispensing correct fuel, and fuel may not be dispensed when the fuelling gun is inserted for dispensing incorrect fuel, thereby basically resolving the problem of incorrectly fuelling gasoline fuel and diesel fuel.

For convenience in explanation and accurate definition in the appended claims, the terms "upper", "lower", "inner" and "outer' are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A misfuelling prevention system for a vehicle, comprising:
    an upper housing which is installed at an inlet side of a fuel filler neck;
    an inner housing which is supported in the fuel filler neck, positioned in a bottom portion of the upper housing, and slidable in a single direction by a center returning spring that is interposed between the upper housing side and the inner housing;
    a stopper and a stopper spring, the stopper being rotatably installed at a side of the inner housing and elastically biased by the stopper spring, wherein the stopper is rotatable when a fuelling gun contacts with an end of the stopper; and
    a flapper elastically biased by a flapper spring, the flapper having a first end that is rotatably installed at another side of the inner housing and a second end that is selectively caught in a groove portion of the stopper, wherein the flapper is opened by being pushed by the fuelling gun when the flapper is released from being caught by the stopper while the fuelling gun contacts with the end of the stopper.

2. The misfuelling prevention system of claim 1, wherein the upper housing and the inner housing have a guide groove in a horizontal direction and a guide projection in the horizontal direction respectively, and are slidingly coupled to each other by the guide groove and the guide projection so that the inner housing is slidingly guided in the upper housing.

3. The misfuelling prevention system of claim 2, wherein an elastic coefficient of the center returning spring which is interposed between the upper housing and the inner housing is smaller than an elastic coefficient of the stopper spring.

4. The misfuelling prevention system of claim 2, wherein a rotation prevention guide is positioned at a rear side of the stopper and protrudes from the upper housing downwards so as to restrict rotation of the stopper.

5. The misfuelling prevention system of claim 2, wherein an inner diameter of the inner housing is set to a maximum of 32 mm, and an interval between a contact protruding portion of the stopper which is positioned to protrude toward an inner side of the inner housing and a housing wall surface is set to 22 to 23 mm.

6. The misfuelling prevention system of claim 1, wherein an elastic coefficient of the center returning spring which is interposed between the upper housing and the inner housing is smaller than an elastic coefficient of the stopper spring.

7. The misfuelling prevention system of claim 1, wherein a rotation prevention guide is positioned at a rear side of the stopper and protrudes from the upper housing downwards so as to restrict rotation of the stopper.

8. The misfuelling prevention system of claim 1, wherein an inner diameter of the inner housing is set to a maximum of 32 mm, and an interval between a contact protruding portion of the stopper which is positioned to protrude toward an inner side of the inner housing and a housing wall surface is set to 22 to 23 mm.

* * * * *